(No Model.)
D. LUMBERT.
Broiler.
No. 241,035. Patented May 3, 1881.
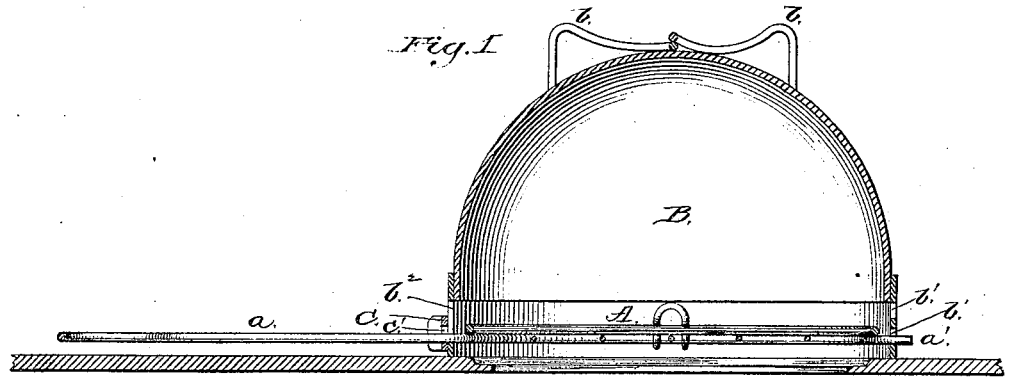
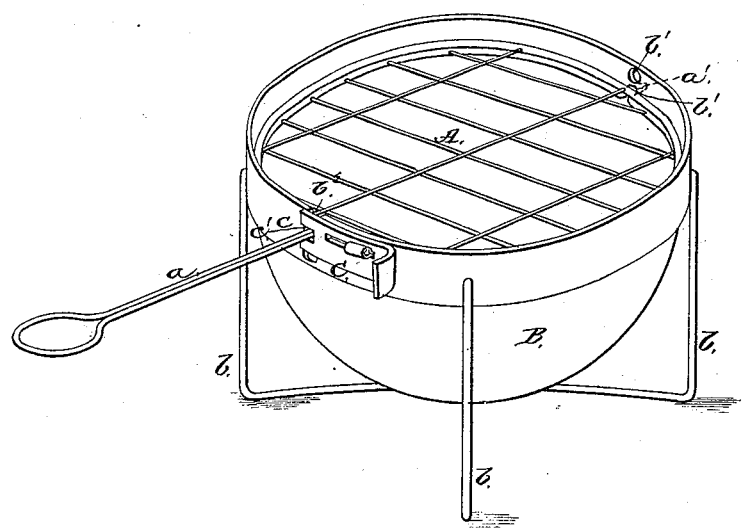
WITNESSES
John A. Ellis
Philip L. Mase
INVENTOR
Daniel Lumbert
by Anderson & Smith
his ATTORNEYS

UNITED STATES PATENT OFFICE.

DANIEL LUMBERT, OF CENTREVILLE, MASSACHUSETTS.

BROILER.

SPECIFICATION forming part of Letters Patent No. 241,035, dated May 3, 1881.

Application filed February 26, 1881. (No model.)

*To all whom it may concern:*

Be it known that I, DANIEL LUMBERT, a citizen of the United States, residing at Centreville, in the county of Barnstable and State of Massachusetts, have invented certain new and useful Improvements in Broilers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a vertical sectional view, and Fig. 2 is a perspective view, of a broiler embodying my improvements.

This invention relates to broilers for broiling meat, toasting bread, &c.; and it consists in the improved features of construction and combination hereinafter fully described, and particularly pointed out in the claim.

In the accompanying drawings, A designates a broiler, having the handle $a$ and point $a'$.

B designates a drip-pan, having the legs $b$, two holes, $b'$ $b'$, in its rim, at one side, and opposite these holes $b'$ $b'$ a vertical slot, $b^2$, the bottom of which is in the same plane with the lower hole $b'$.

A slide, C, secured to the rim of the drip-pan B by a pin passed through a slot in the slide, is provided at its forward end with a notch, $c'$, and at its rear end with a finger-piece for operating it. When the point $a'$ is placed in the upper hole $b'$ the handle $a$ has its bearing in the notch $c'$ of the slide; but when the point $a'$ has its bearing in the lower hole $b'$ the handle $a$ has its bearing in the bottom of the vertical slot $b^2$. The object of this adjustment is to place the broiler A nearer to or farther from the fire, as may be desired. It is obvious that the number of notches $c'$ and holes $b'$ may be increased for this purpose without departing from the invention.

The broiler is put in place by inserting the point $a'$ in one of the holes $b'$ and placing the handle in a corresponding position at slot $b^2$. This pan has a size and shape suited to the broiler, so that whatever position the latter may have in the former this can be turned freely about that.

The utensil is placed upon the stove, the lid being removed from the hole, with the broiler under the pan. This keeps the fumes in. When finished, by lifting the device up the pan swings underneath, so as to catch any drip.

Various-sized broilers can be made, some large enough to cover the entire open space at the front of the stove.

The legs upon the pan are useful for setting the device down.

What I claim is—

In a broiler, the combination, with the broiler A, having handle $a$ and point $a'$, of the drip-pan B, provided with the legs $b$ and the holes $b'$ $b'$ in the rim thereof, at one side, the vertical slot $b^2$ at the other side, and the slide having the notch $c'$ in its front end, constructed and operating substantially as and for the purposes set forth.

In testimony whereof I affix my signature in presence of two witnesses.

DANIEL LUMBERT.

Witnesses:
 HORACE JONES,
 HORACE F. HALLETT.